United States Patent [19]
Robinson

[11] 3,838,900
[45] Oct. 1, 1974

[54] BEARINGS FOR RAILWAY VEHICLE AXLES

[75] Inventor: Gerald Clifford William Robinson, Maidenhead, England

[73] Assignee: Vandervell Products Limited, Maidenhead, England

[22] Filed: Sept. 22, 1972

[21] Appl. No.: 291,260

[30] Foreign Application Priority Data
Oct. 12, 1971 Great Britain .................. 47545/71

[52] U.S. Cl. .............................................. 308/43
[51] Int. Cl. .......................................... F16c 35/00
[58] Field of Search ............. 308/38, 43, 54, 56, 57

[56] References Cited
UNITED STATES PATENTS

| | | | |
|---|---|---|---|
| 1,537,061 | 5/1925 | Blunt | 308/43 |
| 1,685,212 | 9/1928 | Blunt | 308/43 |
| 1,746,129 | 2/1930 | Robinson, Jr. | 308/57 |
| 2,306,916 | 12/1942 | Swan | 308/43 |

FOREIGN PATENTS OR APPLICATIONS
243,253  11/1925  Great Britain ...................... 308/54

Primary Examiner—Charles J. Myhre
Assistant Examiner—R. H. Lazarus
Attorney, Agent, or Firm—Mawhinney & Mawhinney

[57] ABSTRACT

The disclosure relates to a bearing for a railway vehicle comprising a bearing block having a part cylindrical recess in which a bearing liner is seated. Tapered keys are driven between one edge of the liner and a first fixed abutment to force the other edge of the liner against a second fixed abutment and to press the liner against the surface of the recess.

4 Claims, 4 Drawing Figures

PATENTED OCT 1 1974 3,838,900

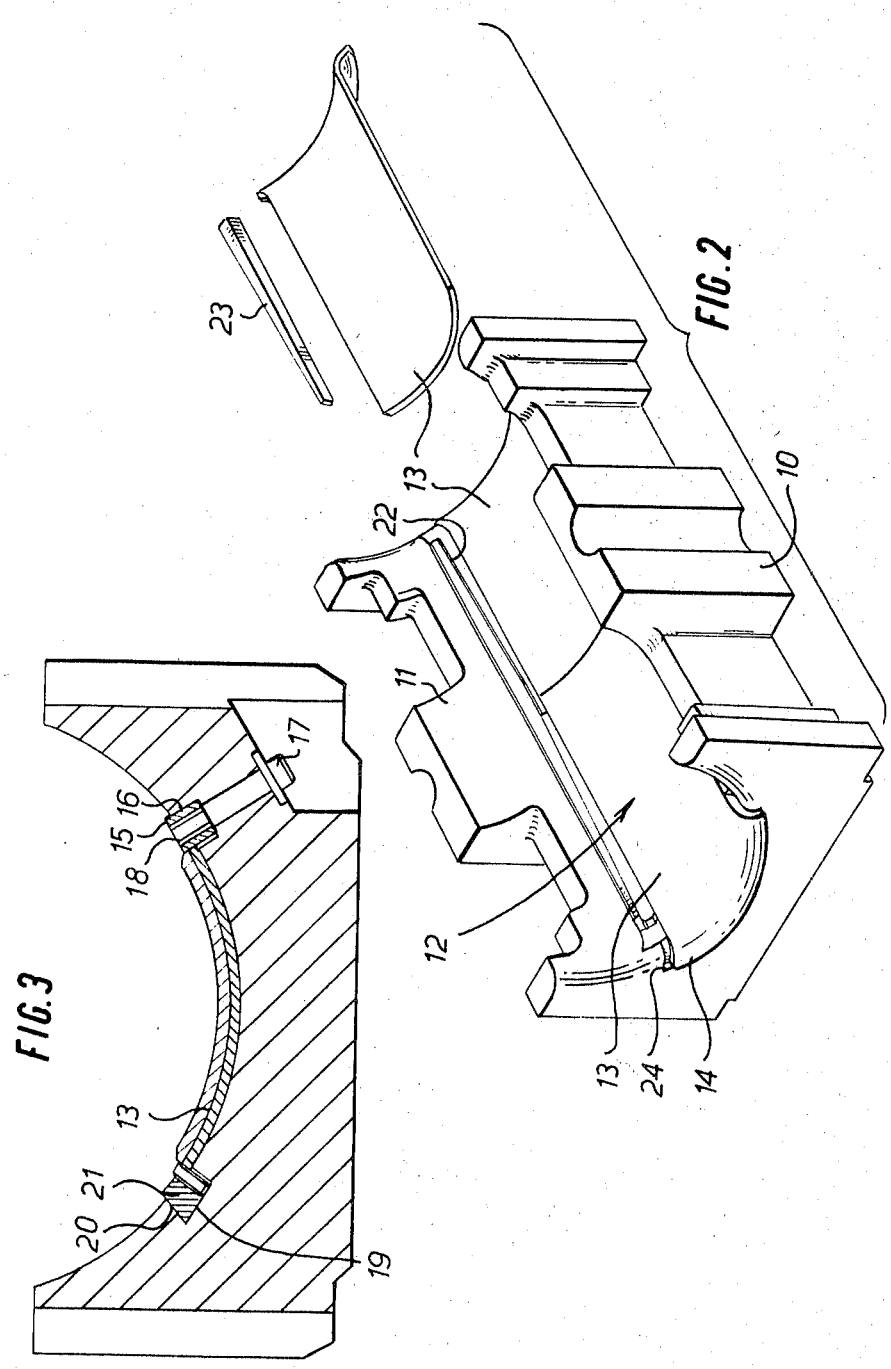

BEARINGS FOR RAILWAY VEHICLE AXLES

BACKGROUND OF THE INVENTION

1. Field of the Invention

The invention relates to bearings for railway vehicles.

2. Description of the Prior Art

Hitherto two forms of bearings for railway vehicles have been commonly used. The first of these comprises a bronze block having a part-cylindrical recess into which a bearing layer of tin-based or lead-based babbit is cast. When such bearings fail a fresh layer of babbit must be cast into the recess. Furthermore the bronze blocks have a high scrap value which results in the theft of blocks from railway vehicles.

The second of the commonly used forms of bearing is a roller bearing and whilst such bearings fail less frequently than the above described bearing their cost is considerably greater.

Further constructions of bearings for railway vehicles have been proposed. For example U.K. Patent Specification No. 567185 discloses a bearing comprising a cast iron bearing block having a part-cylindrical recess in which a separate bearing liner is seated in place of the conventional cast in bearing layer. Since the liner merely rests against the recess in the block and the block is formed from cast iron which has a relatively low thermal conductivity, in certain circumstances over-heating of the bearing leading to bearing failure is likely to occur due to inadequate heat flow from the bearing to the bearing block.

There is a further proposed construction in U.K. Patent Specification No. 604196 in which a bearing for a railway vehicle axle is described comprising a block having a part-cylindrical recess in which a separate bearing liner is held in place by a single key. The single key would not be capable of applying a uniform force to the edge of the liner and so the force pressing the liner into the recess would vary along the length of the liner. As a result the heat transfer from the liner to the block would vary along the length of the liner and this would lead to uneven wear of the bearing surface.

The object of the present invention is to overcome the disadvantages of the previous constructions as outlined above.

SUMMARY OF THE INVENTION

The invention provides a bearing for a railway vehicle comprising a bearing block having a part-cylindrical recess and a bearing liner held in the recess in the block, characterised in that the bearing liner is held in the recess by a first abutment extending along the recess with which one axial edge of the liner engages, a second abutment extending along the recess and spaced opposite the other axial edge of the liner, the second abutment having wedge faces which converge towards said other liner edge towards the centre of the abutment and two tapered keys driven between the other liner edge and the two wedge faces to apply a uniform compressive force along the edge of the liner to press the liner against the surface of the recess.

Since a uniform force is applied by the two tapered keys to the edge of the liner the force holding the liner against the recess is substantially uniform along the length of the liner so that heat transfer to the block and therefore wear of the bearing material will be uniform along the liner.

BRIEF DESCRIPTION OF THE DRAWING

FIG. 2 is a three-quarter perspective view of the bearing shown in FIG. 1, illustrating the method of assembly;

FIG. 3 is a cross-sectional view through the bearing of FIGS. 1 and 2; and

DESCRIPTION OF THE PREFERRED EMBODIMENTS

Figure 1:
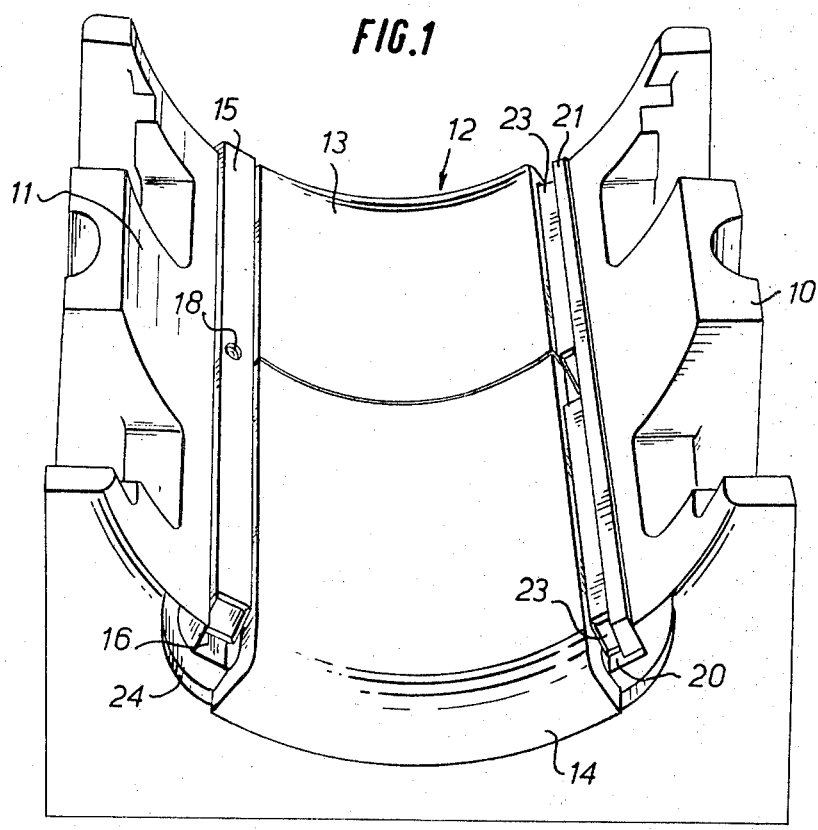
FIG. 1 is an end perspective view of one form of bearing for a railway vehicle axle.

Referring firstly to FIGS. 1 to 3 of the drawings, the bearing shown comprises a cast aluminium silicon bearing block 10 having a machined part cylindrical recess 11 extending along the length of one side of the block.

An arcuate flanged bearing liner indicated generally at 12 is seated in the recess 11. Liner 12 comprises two identical parts 13 each having an out-turned flange 14 at one end thereof which overlies an end face of the block 10. The length of the liner parts is such that there is a slight gap between the adjacent ends of the liner parts at the centre of the block. The circumferential length of each liner part is such that an angle of 65° is subtended at the axis of the liner part. The liner parts are formed from bi-metallic strip comprising a steel backing layer having a coating of lead based babbit.

One axially extending edge of each of the liners 13 engages a side face of an abutment member 15 which projects from a slot 16 extending axially along the recess 11 in the block 10. The abutment member 15 is held in the slot 16 by a single screw 17 extending from the under side of the block into a screw threaded bore 18 at the centre of the member 15. Adjacent the other axially extending edges of the liner parts 12 there is a slot 19 extending axially along the recess 11 in the block. The side of the slot remote from the liners 13 is undercut as indicated at 20. Slot 19 contains an abutment member 21 extending along the length thereof which has a part dove-tailed section to engage the undercut 20. The side of the member 21 adjacent the liner parts 13 has two wedge faces 22 which converge towards the liners towards the centre of the member. As best seen in FIG. 3 of the drawings, the circumferential length of the liner parts 13 is slightly greater than the distance between the adjacent sides of the slots 16, 19 so that the liner parts 13 overhang the slots 19 slightly. Two tapered keys 23 of similar length to the liner parts and formed in aluminium silicon alloy are driven into opposite ends of the slot 19 between the wedge surfaces 22 and the overhanging axial extending edges of the liner parts 13. A force of 300 lb is applied to the keys to drive the keys between the liner edges and wedge surfaces 22 to compress the liner circumferentially uniformly along the length of the liner and force the liner into intimate contact with the surface of the recess to ensure good heat transmission between the liner and block along the length of the liner. The liner parts 13 are thus firmly held between the keys 23 and the abutment 15 and the outer faces of the liner parts are pressed into intimate engagement with the surface of the recess 11 in the block. This ensures good heat transfer between the liner and the block. The taper of the keys 23 and the angle of the wedge surface 22 is sufficiently shallow that the keys remain in situ when driven into place and do not tend to work out. Since the abutment member 21 has a dove-tail section which engages in an undercut 20 in the side of the recess 19, once the keys 23 have been driven into place the abutment member cannot move radially outwardly of the slot.

As indicated earlier the liner parts 12 are formed from bi-metallic strip comprising a steel backing and a layer of lead based babbit. Both the keys 23 and the abutment 15 are formed from aluminium silicon alloy having good bearing properties and project above the level of the steel backing layer of the liner parts whilst stopping short of the upper surface of the bearing layer. Thus if the babbit is worn away the keys 23 and abutment 15 are engaged first before the steel back of the liner.

As indicated earlier the liner parts 13 have outturned flanges 14 at the ends of the block 10. The end faces of the block are recessed as indicated at 24 to partly receive the flanges 14. The depth of the recesses 24 is such that the inter face between the babbit and the steel backing of the flange 14 is located below the end surface of the block. Thus if the babbit on the flange 14 is worn away and end face of the aluminium silicon block is engaged rather than the steel backing of the flange 14.

As indicated above the block 10 is formed from an aluminium silicon alloy which is both a good bearing material and has a high thermal conductivity. It is preferred that the thermal conductivity of the alloy is at least 0.20 calories/second/centimetre cube/ degree centigrade to ensure good dissipation of heat from the bearing liner. Three suitable alloys are LM27, LM24 and LM6, some constituents and properties of these alloys are as follows:

|    | LM24    | LM27    | LM6     |
|----|---------|---------|---------|
| Cu | 3 – 4   | 1.5/2.5 | .1      |
| Mg | 0.1     | 0.3     | .1      |
| Si | 7.5/9.5 | 6/8     | 10/13   |
| Fe | 1.3     | 0.8 max | 0.6     |
| Mn | 0.5     | 0.2/.6  | 0.5     |
| Ni | 0.5     | 0.3     | 0.1     |
| Zn | 3.0     | 1.0     | 0.1     |
| Pb | 0.3     | 0.2     | 0.1     |
| Sn | 0.2     | 0.1     | 0.05    |
| Ti | 0.2     | 0.2     | 0.2     |
| Al | Balance | Balance | Balance |
| Thermal conductivity | 0.23 cgs | 0.36 cgs | 0.34 cgs |

Of the alloys listed above, LM27 has the highest thermal conductivity and this is the preferred alloy for the block. The key 23 and abutment member 15 may be formed in the same or a similar alloy.

In use, the above described bearing is mounted in an axle box of a railway vehicle with the liner 12 facing downwardly to receive the axle. The diameter of the inner surface of the liner is made slightly greater than the diameter of the shaft which is to mate with the liner when the shaft is unworn. By way of example in the case of a 4.5 inch. diameter shaft, the diameter of the liner may be 40 thousandths of an inch greater than the diameter of the unworn axle. The internal surface of each liner may be machined or formed to the required finish and contour by coin pressing.

In one variation of the above construction the curvature of the internal surface of the liner may vary from a maximum at the centre of the liner to a minimum at the circumferential edges so that a pocket is formed with the shaft at the centre of the liner to retain lubricant. In a further variation the internal surface of the liner may be spaced indentations or serrations to trap lubricant or to assist in running in by allowing the bearing to conform quickly to the shaft.

Aluminium silicon alloys as set out above are super plastic in a temperature range of the order of 200°C - 300°C and so the block 10 can conveniently be formed by backward extrusion of a slug of the aluminium silicon alloy at a temperature at which the alloy is super plastic in a pair of appropriately shaped dies followed by machining operations after the block has cooled.

Figure 4:
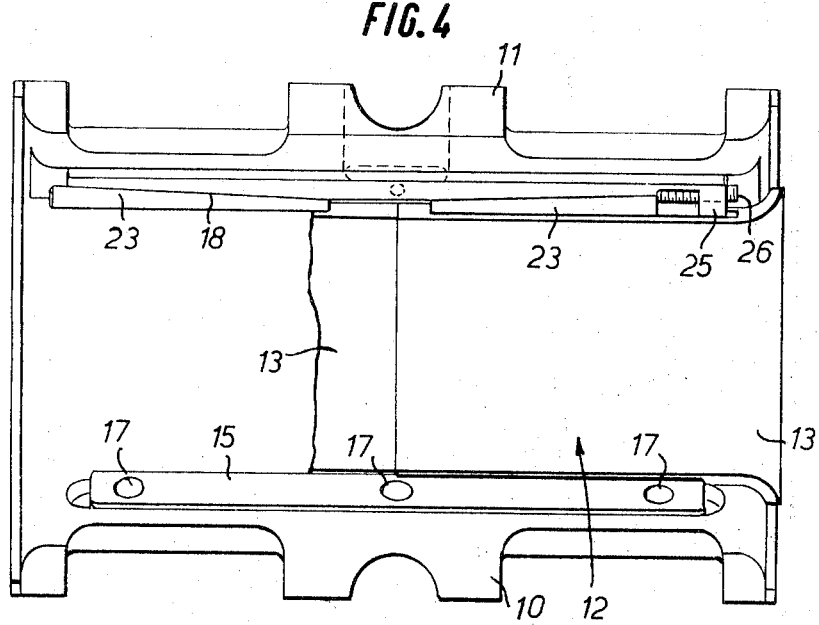
FIG. 4 is a plan view of a similar bearing showing two modifications.

Reference is now made to FIG. 4 of the drawings which shows two small modifications to the bearing illustrated in FIGS. 1-3. Firstly the slot 16 for engaging one axial edge of the liner 12 stops short of the ends of the block 10 and the abutment member 15 is correspondingly shorter. Also the abutment member is held in the slot by three spaced screws 17 extending through the block from the underside thereof. Also illustrated in the right hand part of FIG. 4 is an alternative to self-locking keys 23. The end of the abutment member 21 extends beyond the end of key 23 and is formed with a lug 25 which projects opposite the end of the key. A grub screw 26 extends through the lug 25 and bears on the end of the key 23 to hold the key in place. The arrangement is otherwise similar to that of FIGS. 1-3.

I claim:

1. A bearing for a railway vehicle axle comprising a bearing block having a part-cylindrical recess, the recess having two axially extending slots which are spaced apart around the recess, an elongated abutment located in one of the slots and projecting therefrom, a segmental arcuate bearing liner extending along the recess, said liner being formed in two parts which are located end to end in the recess with a gap between said parts, the liner having one axially extending edge in engagement with said abutment and a second axially extending edge projecting over the other of said slots, a second elongated abutment located in said other slot and having wedge faces which converge towards said second edge of the liner towards the center of the second abutment and two tapered keys driven between the second liner edge and the two wedge faces, said keys engaging the second liner edge along substantially the entire edge to apply a uniform circumferential force along the line and thereby hold the liner in intimate engagement with the recess.

2. A bearing as claimed in claim 1 wherein the side of the further slot engaged by the second abutment is undercut and the second abutment has a part-dovetail cross-section to engage the undercut so that the second abutment is prevented from moving in a radial direction out of the slot when the keys are in place.

3. A bearing as claimed in claim 1 wherein the keys are self-locking between the liner and the second abutment.

4. A bearing as claimed in claim 1 wherein the liner has flanges at both axial ends thereof which abut side faces of the block.

* * * * *